Patented Nov. 16, 1943

2,334,291

UNITED STATES PATENT OFFICE 2,334,291

TETRACYCLIC COMPOUNDS AND PROCESS OF MAKING SAME

Leopold Ruzicka and Moses Wolf Goldberg, Zurich, Switzerland, assignors to Ciba Pharmaceutical Products, Incorporated, Summit, N. J., a corporation of New Jersey No Drawing. Application February 4, 1941, Serial No. 377,403. In Switzerland March 14, 1940

6 Claims. (Cl. 260—478)

It has been found that new tetracyclic compounds may be obtained by treating nuclear saturated or unsaturated carbonyl compounds of the ring-homo- or ring-nor-steroid series in a manner of itself known with agents capable of transforming the group —CO— into the group —CR(OH)—, R representing hydrogen, a saturated or unsaturated hydrocarbon radical such as an alkyl, aralkyl, alkenyl or alkinyl group, or a cyanogen group, and treating these alcohols, if desired, with esterifying or etherifying agents.

All tetracyclic carbonyl compounds, that is to say, ketones and aldehydes, which may be derived from compounds of the cyclopentanopolyhydrophenanthrene series by ring extension (ring-homo compounds) or by ring contraction (ring-nor compounds) of one or several of the 4 rings and therefore are anellated in the manner of the steroids may be used as parent materials for the new process. In addition to the carbonyl groups they may naturally contain any other desired substituents, for example, esterified and etherified hydroxyl groups, substituted and unsubstituted hydrocarbon radicals, such as alkyl, alkenyl, alkinyl, alkylene, acyl, or ketol groups, free and substituted carboxyl, amino or thiol groups, as well as carbonyl groups in the form of their derivatives, such as their enol derivatives, for example, enol ethers and enol esters, their ketals or acetals or their hydrazones, such as phenylhydrazones or semi-carbazones. Parent materials for the new process may be obtained, for example, from cyclopentanopolyhydrophenanthrene compounds by ring extension and/or ring contraction, by total synthesis as well as, if desired, by subsequent application of methods, of themselves known, for the conversion, introduction or elimination of substituents and/or multiple bonds.

For the conversion of the carbonyl groups into the secondary or tertiary carbinol groupings, all the chemical, biochemical or electrochemical methods, of themselves known, may find application, and especially those which are used also in the steroid series. Sensitive substituents or multiple bonds which may be present may, at the same time, be protected intermediately, if desired, in a manner of itself known; for example, additional carbonyl groups or $\alpha,\beta$-unsaturated carbonyl groups which are not to be reduced during the process may be intermediately converted into the derivatives mentioned. The conversion of the carbonyl group into the secondary carbinol group takes place by means of simple reducing agents. For the conversion into tertiary alcohols, organo-metal compounds, for example, such as alkyl, alkenyl or alkinyl magnesium halides, or metal acetylenides—preferably in a homogeneous phase—are allowed to react upon the parent materials and the addition compounds formed are hydrolized. The addition of hydro-cyanic acid is also a useful method.

Finally, the products of the present process may be converted in known manner either into their esters, for example, their acetates, propionates, butyrates, benzoates, substituted carbonates, phthalates, phosphates or succinates by the action of esterifying agents, or, by the action of etherifying agents, into their ethers, such as their methyl, ethyl, benzyl, triarylmethyl ethers. Should there still remain carbonyl groups in the new compounds, enol derivatives, such as enol esters and enol ethers, or acetals or mercaptals may be obtained by the action of esterifying or etherifying agents.

Among tetracyclic compounds obtained by means of the new process are highly active compounds possessing sexual or suprarenal cortical hormone activity.

Example 1

$\Delta^4$-3,17a-diketo-D-homo-androstene (prepared, for example, by reduction of t-dehydroandrosterone cyanhydrin, oxidation of the amine according to Oppenauer and diazotization, when ring extension takes place) is converted into its 3-mono-enolethylether in a manner of itself known by reaction with ethyl orthoformate. 1 part of this ether is dissolved in 50 parts of n-propl alcohol, and 2 parts of sodium are added gradually to this boiling solution. After completion of the reaction, the solution is concentrated, the residue is extracted with ether and the ethereal solution is washed with water, dried and evaporated. The residue is boiled with dilute alcoholic hydrochloric acid, and the solution is diluted and extracted with ether. On evaporating the ethereal solution, previously washed with bicarbonate solution and water, crude Δ⁴-3 - keto - 17a - hydroxy - D - homo-androstene, possessing the probable formula

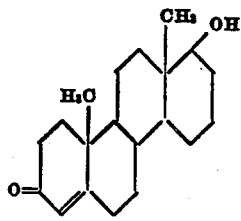

is obtained and may be recrystallized from acetone.

In place of sodium and propyl alcohol, the reduction may be carried out with nascent hydrogen obtained in another manner, for example, by electrochemical methods or from alkali amalgams. Other reducing agents are also suitable, for instance, hydrogen which is activated catalytically, for example by a nickel catalyst, or Grignard reagents prone to produce unsaturated hydrocarbon radicals, such as iso-propyl magnesium halides.

The intermediate protection of the 3-keto group may be carried out also by the formation of other enol derivatives, of acetals, for example, such as the diethylacetal, glycol ketal or propylene glycol ketal, further of mercaptals, such as the methyl-, ethyl- or benzylmercaptal, and also of hydrazones, such as the semicarbazone. If the reduction is carried out by biochemical means, for example by means of yeast, or by the method of exchange of oxidation stages, for example by an alcohol in the presence of an aluminium alcoholate or phenolate, an intermediate protection of the 3-keto group by enolization or the like may be unnecessary.

The new oxyketone proves to be a highly active compound of the male hormone type. By gentle acylation, it yields monoesters, for example, an acetate, propionate, n-butyrate, benzoate, chlorocarbonate, succinate. Mono-ethers may be obtained analogously. The energetic action of esterifying or etherifying agents yields diesters or diethers by enolization, for example the diacetate or dipropionate. Mixed esters, ethers or ester-ethers may also be prepared.

In an analgous manner, for example, the saturated di-ketone, 3,17a - diketo - D - homo-androstane, as well as the saturated and unsaturated oxyketones, 3-keto-17a-hydroxy-D-homo-androstane and 3-hydroxy-17a-keto-D-homo-androstane, and also, for example, Δ¹,³,⁵-3-hydroxy - 17a-keto-D-homo-oestratriene, their esters or ethers, may also be reduced. In this manner, for example, partially esterified or etherified diols are obtained into which a second similar or dissimilar ester or ether radical may subsequently be introduced.

In place of D-homo-androstane compounds, carbonyl compounds of other desired ring-homo- and ring-nor-steroids may be used as parent materials, for example, saturated and unsaturated A-nor-, A-homo-, A-nor-D-homo-, A-homo-D-homo-androstanes or pregnanes, or even homo-oestranes.

*Example 2*

A Grignard solution is prepared in ether from 1 part of magnesium and 6 parts of methyl iodide. To this solution is added a solution of 6 parts of Δ⁴-3,17a-diketo-D-homo-androstene-3-mono-enol methyl ether, prepared with methyl orthoformate in a manner of itself known. When the reaction is complete, dilute hydrochloric acid is added, the ether layer is removed, ethereal hydrochloric acid is added to it and, in order to split the enol-ether, the reaction mixture is warmed. The washed ether solution yields, on concentration, Δ⁴-3-keto-17a-hydroxy-17a-methyl-D-homo-androstene of the probable formula

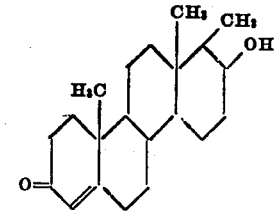

This may be converted by strong acylating agents into its 17-mono-esters or, by more energetic action, also into its 3-enol-17-diesters.

In an analogous manner, by the action of corresponding Grignard reagents and, if desired, subsequent esterification or etherification derivatives may be obtained which are substituted in the 17a-position by the groups, for example, $$\left\{\begin{matrix}-x\\-C_2H_5,\end{matrix}\right. \left\{\begin{matrix}-x\\-CH_2-CH=CH_2,\end{matrix}\right. \left\{\begin{matrix}-x\\-CH_2.C_6H_5,\end{matrix}\right. \left\{\begin{matrix}-x\\-C\equiv C.R'\end{matrix}\right.$$

The latter compounds may also be prepared by the action of metal acetylenides, preferably in a homogeneous phase, such as in amylene hydrate or in liquid ammonia.

By the action of hydrocyanic acid the 17a-cyanhydrins are obtained which may be converted into their esters.

So quite generally compounds may be obtained of the formula

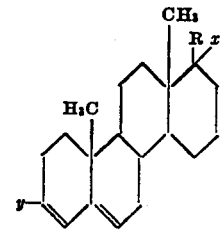

wherein $y$ stands for a radical convertible in hydroxyl with the aid of hydrolyzing agents, R stands for a hydrocarbon radical or cyanogen and $x$ stands for hydroxyl or a radical convertible in hydroxyl with the aid of hydrolyzing agents.

If instead of from a Δ⁴-3,17a-diketo-D-homo-androstene-3-mono-enol-ether or ester one starts for example from Δ⁵-3-hydroxy-17-keto-D-homo-androstene or a derivative with substituted hydroxyl group, quite analogously compounds may be obtained of the formula

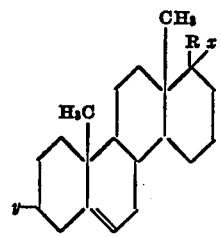

wherein $x$ and $y$ stand for hydroxyl and a radical convertible in hydroxyl with the aid of hydrolyzing agents and R stands for a hydrocarbon radical, like methyl, ethyl, ethinyl, ethenyl, alkyl, benzyl.

In a similar manner, other carbonyl compounds of the D-homo-steroids, for example, of the homo-oestrone series, or other such ring-homo- and ring-nor-steroids may also be converted into the corresponding tertiary alcohols, their esters or ethers.

What we claim is:

1. A member of the group consisting of nuclear saturated and unsaturated compounds of the ring-D-homo-steroids and containing in 17a-position the group

wherein R is a hydrocarbon radical, and $x$ stands for a member of the group consisting of hydroxyl and a radical convertible into hydroxyl with the aid of hydrolyzing agents.

2. A member of the group consisting of nuclear saturated and unsaturated compounds of the ring D-homo-androstane series, containing in 3-position a member of the group consisting of a hydroxyl and a radical convertible in hydroxyl with the aid of hydrolyzing agents, and containing furthermore in 17a-position the group

wherein R stands for a hydrocarbon radical and $x$ stands for a member of the group consisting of hydroxyl and a radical convertible into hydroxyl with the aid of hydrolyzing agents.

3. The unsaturated compounds of the formula

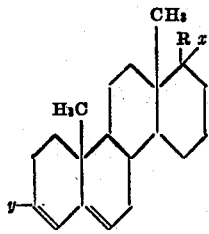

wherein $y$ stands for a radical convertible into hydroxyl with the aid of hydrolyzing agents, R stands for a hydrocarbon radical and $x$ stands for a member of the group consisting of hydrogen and a radical convertible into hydroxyl with the aid of hydrolyzing agents.

4. The unsaturated compounds of the formula

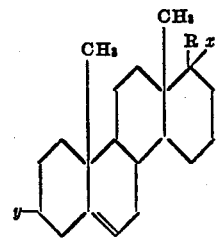

wherein $x$ and $y$ stand for hydroxyl and a radical convertible into hydroxyl with the aid of hydrolyzing agents and R stands for a hydrocarbon radical.

5. The unsaturated compounds of the formula

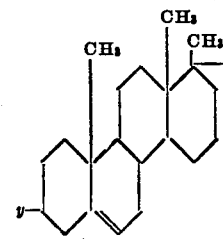

wherein $x$ and $y$ stand for hydroxyl and a radical convertible into hydroxyl with the aid of hydrolyzing agents.

6. The unsaturated compounds of the formula

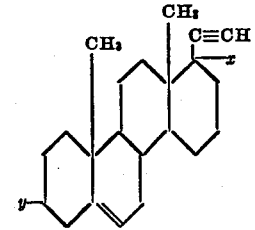

wherein $x$ and $y$ stand for hydroxyl and a radical convertible into hydroxyl with the aid of hydrolyzing agents.

LEOPOLD RUZICKA.
MOSES WOLF GOLDBERG.